(12) United States Patent
Rammohan

(10) Patent No.: US 10,719,810 B2
(45) Date of Patent: *Jul. 21, 2020

(54) METHODS AND SYSTEMS FOR A JOB SUGGESTIONS ENGINE AND TALENT TIMELINE IN A TALENT MANAGEMENT APPLICATION

(71) Applicant: Oracle International Corporation, Redwood Shores, CA (US)

(72) Inventor: Deepak Rammohan, San Carlos, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 16/033,102

(22) Filed: Jul. 11, 2018

(65) Prior Publication Data

US 2018/0322467 A1 Nov. 8, 2018

Related U.S. Application Data

(63) Continuation of application No. 14/023,379, filed on Sep. 10, 2013, now Pat. No. 10,049,344.

(60) Provisional application No. 61/699,593, filed on Sep. 11, 2012, provisional application No. 61/699,600, filed on Sep. 11, 2012.

(51) Int. Cl.
G06Q 10/00 (2012.01)
G06Q 10/10 (2012.01)

(52) U.S. Cl.
CPC ......... *G06Q 10/1053* (2013.01); *G06Q 10/10* (2013.01)

(58) Field of Classification Search
USPC .................................. 705/321, 320
See application file for complete search history.

(56) References Cited

U.S. PATENT DOCUMENTS 6,728,695 B1 * 4/2004 Pathria ............... G06F 17/2715
9,818,086 B2 11/2017 Thankappan et al.
(Continued)

OTHER PUBLICATIONS

U.S. Appl. No. 14/023,310, Corrected Notice of Allowability dated Jul. 21, 2017, 2 pages.
(Continued)

*Primary Examiner* — Gabrielle A McCormick
(74) *Attorney, Agent, or Firm* — Kraguljac Law Group, LLC

(57) ABSTRACT

Techniques for automatically suggesting one or more employment positions are provided. A method may include receiving, by a computing device, candidate data relating to an employment position candidate. The computing device may then match the employment position candidate with one or more employment positions based on the received candidate data. Once the employment position candidate is matched with the one or more employment positions, the computing device may generate one or more suggested employment positions for the employment position candidate, wherein the one or more suggested employment positions are automatically generated based on the matching of the employment position candidate with the one or more employment positions.

20 Claims, 20 Drawing Sheets

(56) References Cited

U.S. PATENT DOCUMENTS

| | | |
|---|---|---|
| 2002/0042786 A1* | 4/2002 | Scarborough ........ G06Q 10/063 706/21 |
| 2006/0265267 A1 | 11/2006 | Chen et al. |
| 2008/0300952 A1 | 12/2008 | Couper |
| 2012/0271775 A1 | 10/2012 | Bell et al. |
| 2012/0330856 A1 | 12/2012 | Hyder et al. |
| 2013/0262469 A1* | 10/2013 | Whitman ............... G06Q 30/02 707/741 |
| 2014/0074738 A1 | 3/2014 | Thankappan et al. |
| 2014/0074739 A1 | 3/2014 | Rammohan |
| 2018/0039948 A1 | 2/2018 | Thankappan et al. |

OTHER PUBLICATIONS

U.S. Appl. No. 14/023,310, Final Office Action dated Feb. 28, 2017, 8 pages.

U.S. Appl. No. 14/023,310, Non-Final Office Action dated Aug. 1, 2016, 9 pages.

U.S. Appl. No. 14/023,310, Notice of Allowance dated Jul. 12, 2017, 8 pages.

U.S. Appl. No. 14/023,379, Final Office Action dated Mar. 2, 2017, 10 pages.

U.S. Appl. No. 14/023,379, Final Office Action dated Jan. 12, 2018, 5 pages.

U.S. Appl. No. 14/023,379, Non-Final Office Action dated Jul. 10, 2017, 5 pages.

U.S. Appl. No. 14/023,379, Non-Final Office Action dated Aug. 2, 2016, 7 pages.

U.S. Appl. No. 14/023,379, Notice of Allowance dated Apr. 12, 2018, 8 pages.

U.S. Appl. No. 15/785,250, Non-Final Office Action dated Mar. 30, 2018, 5 pages.

* cited by examiner

FIG. 6 iPad 🗢                                    11:17 AM

◁ Back to Your Organization          Position Details                        ⇪ Actions

Java Developer II 605

Position Level    Individual 2
Organization      Development
Region            West Manager           Robert Fluentes
Cost Center       A23321

Head Count Open   3
Approved          Yes

Competitive Metrics 610

"What if?" Modeling 615

Requisition 620

Employees in Position 625

Position Metrics 630

Education    Bachelors
Experience   3-5 years
Salary       $75,000-$95,000
Location     San Jose - Sunnyvale...

Education   | Bachelors           ▽ |
Experience  | 3-5 years           ▽ |
Salary      | $75,000-$95,000     ▽ |
Location    | San Jose - Sunnyvale... |

Results 705

Talent Availability Ratio             was  4:1    now  4:1
[bar chart Jan-May, Open Positions / Candidates, 0-600]

Estimated Time to Hire                was  130    now  130
In Area Market    120 |128  133|  150
At New Millennium       130 days
                        90 days Talent Index®    was 29    now 29

品
                                       Organization        ? Help

Java Developer II 605

| | |
|---|---|
| Position Level | Individual 2 |
| Organization | Development |
| Region | West |
| Manager | Robert Fluentes |
| Cost Center | A23321 |
| Head Count Open | 3 |
| Approved | Yes |

Position Details

Position Metrics 630

| | |
|---|---|
| Education | Bachelors |
| Experience | 3-5 years |
| Salary | $75,000-$95,000 |
| Location | San Jose - Sunnyvale... |

Results 705

Talent Availability Ratio — was 4:1 — now 1:3

Estimated Time to Hire — was 130 — now 58
130 days / 65 days
128 | 133 | 55 | 80

Talent Index® — was 29 — now 72
In Area Market 120 / At New Millennium 40 / 90

- Competitive Metrics 610
- "What if?" Modeling 615
- Requisition 620
- Employees in Position 625

Actions | Organization | Help

FIG. 10

Requisition Details

[Actions]

Java Developer II _605_

| | |
|---|---|
| Requisition ID | 23498y923 |
| Organization | Development |
| Location | San Jose, CA |
| Additional Location | Seattle, WA |
| Status | Draft |
| Requisition Type | Professional |
| Recruiter | Jill Savard |
| Hiring Manager | Robert Fluentes |
| Total Candidates | 0 |
| New Candidates | 0 | tests.
- Recommends system solutions by comparing advantages and disadvantages of custom development and purchase alternatives.
- Integrates applications by designing database architecture and server scripting; studying and establishing connectivity with network systems, search engines, and information servers.
- Creates multimedia applications by using authoring tools.
- Completes applications development by coordinating requirements, schedules, and activities; contributing to team meetings; troubleshooting development and production problems across multiple environments and operating platforms.
- Supports users by developing documentation and assistance tools.
- Updates job knowledge by researching new internet/intranet technologies and software products; participating in educational opportunities; reading professional publications; maintaining personal networks; participating in professional organizations.
- Enhances organization reputation by accepting ownership for accomplishing new and different requests; exploring opportunities to add value to job accomplishments.

Qualifications:
Java, Java Applets, Web Programming Skills, Teamwork, Verbal Communication, Web User Interface Design, Software Requirements, Software Development Process, Object-Oriented Design (OOD), Multimedia Content Development, Software Debugging.

Owners

User Group: N/A
Hiring Manager: Robert Fluentes
Recruiter: Jill Savard

| Primary Location | | Additional Location | |
|---|---|---|---|
| Region: | North America | Region: | North America |
| Country: | USA | Country: | USA |
| State/Province: | CA | State/Province: | WA |
| City: | San Jose | City: | Seattle |

Job Details _1010_

Who works here? _1015_

What is it like to work here? _1020_

What is the work environment _1025_

Advertise your position _1030_

[Organization] [Help]

Requisition Details

Back to Your Organization

Java Developer II _605_

| | |
|---|---|
| Requisition ID | 23498y923 |
| Organization | Development |
| Location | San Jose, CA |
| Additional Location | Seattle, WA |
| Status | Draft |
| Requisition Type | Professional |
| Recruiter | Jill Savard |
| Hiring Manager | Robert Fluentes |
| Total Candidates | 0 |
| New Candidates | 0 |

Actions

Job Boards _1510_

Role Type: Programming/Development    In your Market    In Your Company

*dice*    Source Quality [B]   Source Quality [A] ✕
      Hire Quality [A]   Hire Quality [A]

*careerbuilder*    Source Quality [A]   Source Quality [B] ✕
      Hire Quality [B]   Hire Quality [B]

*msa* _1905_    Source Quality [B]   Source Quality [N/A] ✕
      Hire Quality [A]   Hire Quality [N/A]

Career Sites ⌃

Referral Networks and Social Media ⌃

Job Details _1010_

Who works here? _1015_

What is it like to work here? _1020_

What is the work environment _1025_

Advertise your position _1030_

Organization    Help

METHODS AND SYSTEMS FOR A JOB SUGGESTIONS ENGINE AND TALENT TIMELINE IN A TALENT MANAGEMENT APPLICATION

CROSS-REFERENCES TO RELATED APPLICATIONS

The present application is a continuation of, and claims the benefit and priority of, application Ser. No. 14/023,379, filed on Sep. 10, 2013, entitled "METHODS AND SYSTEMS FOR A JOB SUGGESTIONS ENGINE AND TALENT TIMELINE IN A TALENT MANAGEMENT APPLICATION," U.S. Provisional Application No. 61/699,593, filed Sep. 11, 2012, entitled "METHODS AND SYSTEMS FOR A JOB SUGGESTION ENGINE AND TALENT TIMELINE IN A TALENT MANAGEMENT APPLICATION," and U.S. Provisional Application No. 61/699,600, filed Sep. 11, 2012, entitled "METHODS AND SYSTEMS FOR PROVIDING A TALENT INDEX IN AN INTERFACE FOR A TALENT MANAGEMENT APPLICATION," the entire contents of each are hereby incorporated by reference for all purposes. This application is also related to application Ser. No. 14/023,310, filed on Sep. 10, 2013, entitled "METHODS AND SYSTEMS FOR PROVIDING PREDICTIVE METRICS IN A TALENT MANAGEMENT APPLICATION," the entire contents of which is hereby incorporated by reference as if fully set forth herein, under 35 U.S.C. § 120.

BACKGROUND

Job search and posting techniques for providing information to job candidates and employers are limited to either the supply side of the market or the demand side of the market. Additionally, these prior techniques do not and cannot track recruiting engagements as end-to-end transactions. Therefore, any conclusions drawn from data in these approaches is severely limited. For example, one prior approach involves using a jobs board to post jobs. Such a board can have and can access significant amounts of data about the demand side of the market, including open positions. Some approaches try to aggregate this data by scraping jobs boards and building a representation of the job market based on postings. However, such boards do not have visibility into the available candidates or the filled positions. Accordingly, approaches using jobs board information do not know when the position is filled or who filled it. As another example, various professional social networks may be used to collect data. These networks can have and can access tremendous amounts of information about the supply side of the market, such as available candidates. However, there is no visibility into and use of the entire hiring process, including application, interview, offer, and acceptance, such that it can be considered a completed transaction.

BRIEF SUMMARY

Techniques for matching a candidate to one or more employment positions and suggesting employment positions to the candidate are provided. In some embodiments, a computer-implemented method may be provided that includes receiving, by a computing device, candidate data relating to an employment position candidate. The method may further include matching the employment position candidate with one or more employment positions based on the received candidate data, and generating one or more suggested employment positions for the employment position candidate, wherein the one or more suggested employment positions are automatically generated based on the matching of the employment position candidate with the one or more employment positions.

In some embodiments, a job suggestion system may be provided that includes a memory storing a plurality of instructions and one or more processors configured to access the memory. The one or more processors may be further configured to execute the plurality of instructions to: receive candidate data relating to an employment position candidate; match the employment position candidate with one or more employment positions based on the received candidate data; and generate one or more suggested employment positions for the employment position candidate, wherein the one or more suggested employment positions are automatically generated based on the matching of the employment position candidate with the one or more employment positions.

In some embodiments, a computer-readable memory storing a plurality of instructions executable by one or more processors may be provided, wherein the plurality of instructions may include instructions that cause the one or more processors to receive candidate data relating to an employment position candidate. The instructions may further include instructions that cause the one or more processors to match the employment position candidate with one or more employment positions based on the received candidate data. The instructions may further include instructions that cause the one or more processors to generate one or more suggested employment positions for the employment position candidate, wherein the one or more suggested employment positions are automatically generated based on the matching of the employment position candidate with the one or more employment positions.

The foregoing, together with other features and embodiments, will become more apparent upon referring to the following specification, claims, and accompanying drawings.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIGS. 4-20 illustrate exemplary user interfaces for a talent recruiting application according to one embodiment of the present application.

DETAILED DESCRIPTION

Figure 1:
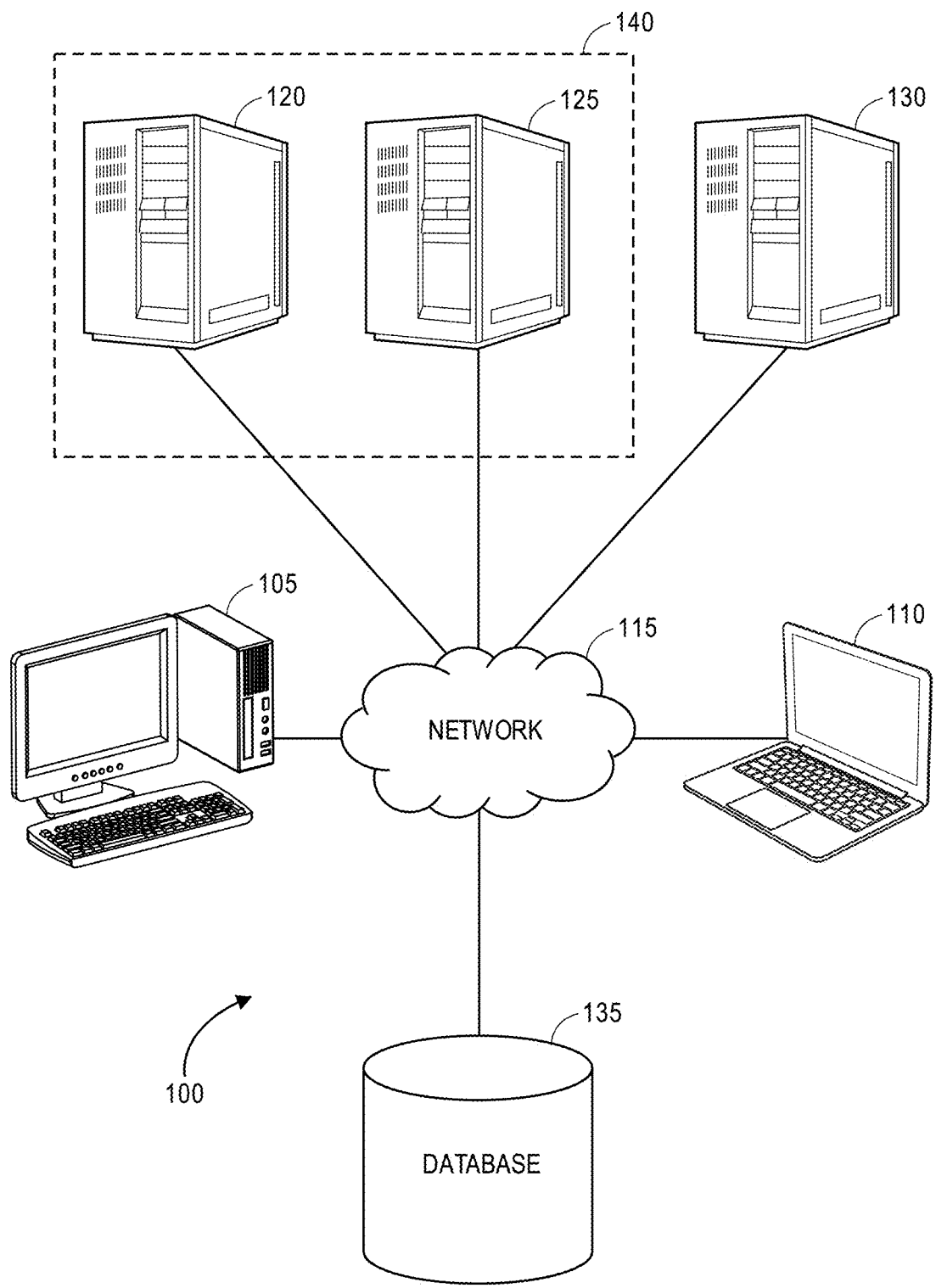
FIG. 1 is a block diagram illustrating components of an exemplary operating environment in which various embodiments of the present application may be implemented.

In the following description, for the purposes of explanation, numerous specific details are set forth in order to provide a thorough understanding of various embodiments of the present application. It will be apparent, however, to one skilled in the art that embodiments of the present application may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the present application are directed to a talent recruiting application which can be used by recruiters and/or managers of a business to recruit and hire candidates for open positions or by the candidates to locate and apply for open positions. Such applications can be implemented in many different ways but in some cases are offered as a cloud-based Software as a Service (SaaS) offering in which the application, running on one or any number of computers, can be made available to customers, typically corporations or other businesses, for use in recruiting talent for open positions.

When offered as SaaS, as a hosted solution, or any other software based service, the talent recruiting application can generate, maintain, and use very large amounts of data related to past and present open positions as well as past and present candidates. For example, the talent recruiting application may receive data relating to a plurality of positions from a group of customers, which may include various companies or businesses that subscribe to the talent recruiting application. The data received from the group of customers may include details of the various positions, such as the location of the position, the description of the candidate requirements, salary expectations, where the position will be posted, and the like. The data may be analyzed to provide insights into detailed statistics of the positions based on information included in the data, such as when and where the position is posted, when one or more applications are submitted by candidates, whether and when any interviews of candidates have been conducted, whether and when offers of employment have been submitted to candidates, whether and when an acceptance of any offers have been received from candidates, and/or details regarding on-boarding of candidates as new employees of the companies. Embodiments of the present application are directed to an application that not only maintains such data but that also tracks a posting for an open position and recruiting engagements as a transaction. These transaction can be tracked from beginning to end, i.e., from a posting of an open position, to an application by a candidate, to an interview of the candidate, to an offer of employment in the position to that candidate, to an acceptance of the offer by the candidate, and even to on-boarding of the candidate as a new employee of the company. Such extensive, end-to-end data, especially when viewed across multiple different customers or businesses, can be used to provide visibility into dynamics of the talent market that would otherwise not be available.

Prior approaches to providing such information were limited to either the supply side of the market, such as the candidates, or the demand side of the market, such as the companies or businesses that have open positions. Additionally, these prior approaches did not and could not track recruiting engagements as end-to-end transactions. Therefore, any conclusions drawn from data in these approaches were severely limited. For example, one prior approach involves a jobs board. Such a board can have and can access significant amounts of data about the demand side of the market (i.e., the open positions). Some approaches try to aggregate this data by scraping jobs boards and building a representation of the job market based on postings. But, such boards do not have visibility into the available candidates or the filled positions. That is, approaches using jobs board information do not know when the position is filled or who filled it. In another approach, various professional social networks can be used to collect data. These networks can have and can access tremendous amounts of information about the supply side of the market (e.g., candidates). But still, there is no visibility into or use of information relating to the entire process, including submission of an application, interview(s), offer, and acceptance, such that it can be considered a completed transaction.

In embodiments of the present application, the talent recruiting application can provide visibility into both supply and demand components of the market to the point where the actual transaction gets consummated, i.e., a candidate gets hired. This is different from a jobs board or social network approaches in that they may know only a piece of the transaction. For example, a job board or social network approach may only know that a job is available or that someone is looking for a position. However, neither of these platforms are aware that there has actually been an application, interview, offer, and/or acceptance. The talent recruiting application of the present application can also have access to other information, such as information about the source for a candidate (e.g., where/how did the candidate learn about this job). Such information might come from a candidate or from a business seeking to fill an open position. In either case, such information provides additional visibility into that transaction.

Using that visibility, embodiments of the present application are directed to providing an engaging candidate experience for a candidate seeking an employment position. For example, an interface of the talent recruiting application allows clients to post open positions and candidates to search for open positions. Tools can also be provided to the recruiters and managers to provide and support the candidate experience so that they can find a right employment position match. Thus, embodiment of the present application include aspects focused on the recruiter and a requisition for open positions, as well as aspects focused on the candidates and providing information about open positions.

For example in one scenario, a manager can post a requisition for a job through an interface of the talent recruiting application. According to one embodiment, considerations such as how hard is it to hire, how much should the business expect to pay, and how long will it take to fill an open position can be quantified as a single measure or index that gives the marketplace an indication of relative difficulty for particular positions. This "talent index" can be a representation of the market based on quantitative and statistical analysis of previous transactions and can give a relative measure of the market between geographic areas. In other words, the extensive data available to the talent recruiting application can be applied across many businesses, markets (i.e., geographic areas), positions, etc. to provide analytics including, but not limited to a talent index, various market metrics to help recruiters, managers, and the like make decisions about hiring, and to perform what-if analysis based on timelines, locations, sources for candidates, and the like to provide information and insight into the market for recruiters and managers. Additionally or alternatively, when a recruiter or manager creates a requisition, other information can be provided to the recruiter where to look for candidates, etc. For example, software engineers in the San Francisco Bay Area are plentiful but there is also big demand for them there. So, it is actually a tough market. But another market might be better for trying to build a team of software engineers and therefore might be recommended.

In some embodiments, the talent recruiting application can also provide a wide variety of information to the candidate. That is, using these tools, recruiters can include additional information about the company, such as what the company does, why it might be a good fit for a candidate, cultural aspects, work environment, neighborhood, transportation, schools, etc. collected from third-party sources or provided by recruiter or manager or from any of a variety of other sources. Together, such information can provide a work culture context for candidates to learn more about the organization. In some cases, additional dimensions that might be important to the candidates can be defined by the candidate, the recruiter, by others recommending the position, current employees, etc. Together, this information creates the right kind of content for a particular open position and for a particular candidate. In other words, information is provided to more fully engage the candidate and market the company and the position to the candidate.

In another scenario, a candidate looking for a job can be presented with job suggestions based on preferences. For example, the talent recruiting application can build a profile for a candidate based on information from various social networks, directly from the candidate, from persons recommending the candidate, etc. Then, the candidate can receive job recommendations from the talent recruiting application based on the profile and other preferences and criteria for the open positions. Once the candidate becomes interested in a particular job, the candidate can apply through the same interface as the information is presented. With the application process, additional, perhaps more detailed, information about the company can be supplied to the candidate. The attributes of the candidate and the open position that can be utilized by the talent recruiting application can provide additional richness beyond simple keyword searching thus providing a better sense of a match between the two.

Embodiments of the present application can also include a matching engine of the talent recruiting application for identifying potential matches between candidates and open positions. For example, once a candidate logs in and based on the profile for that candidate as discussed above, some suggestions can be made. In some cases, the user can fine tune preferences to adjust the recommendations. The matches can be based on data normalized between employers and candidates to map different expressions of the same criteria, attributes, and preferences.

According to one embodiment, matches and information related to matching positions can be provided in a timeline profile view of potential future co-workers. That is, when a candidate is applying and viewing company information, the talent recruiting application can show profiles for selected current employees of the company, e.g., potential co-workers/team members, etc. This view can include experience, education, etc. for those selected employees presented in a graphical format like a timeline. Other applications and uses, as well as variations in the exact implementation of various embodiments of the present application are contemplated and considered within the scope of the present application.

Various specific embodiments relating to the talent recruiting application will now be described below with respect to FIGS. 1-20.

FIG. 1 is a block diagram illustrating components of an exemplary operating environment in which various embodiments of the present application may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java, C, C# or C++, and/or any scripting language, such as Perl, Python, or TCL, as well as combinations of any programming/scripting languages. The server (s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
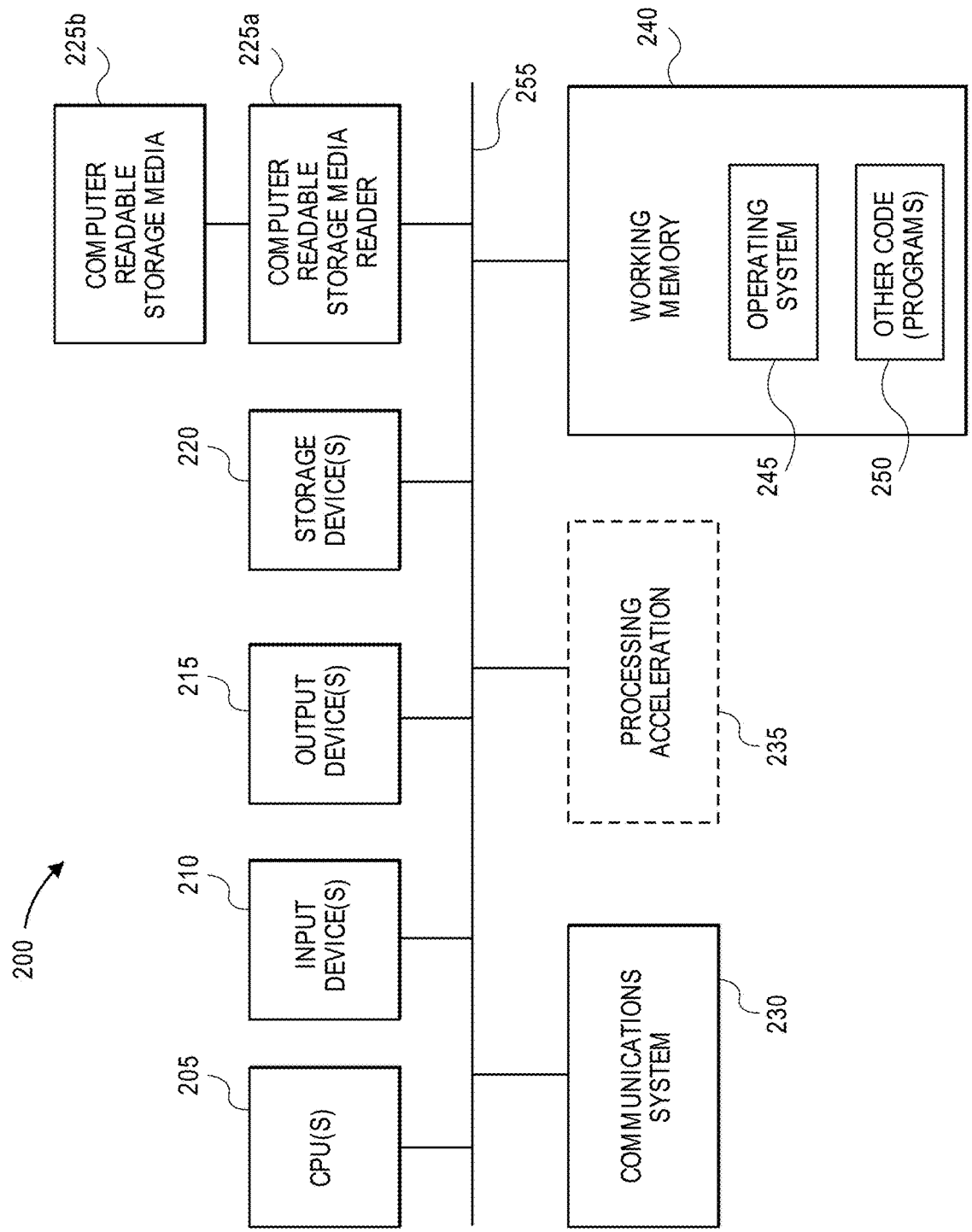
FIG. 2 is a block diagram illustrating an exemplary computer system in which embodiments of the present application may be implemented.

FIG. 2 illustrates an exemplary computer system 200, in which various embodiments of the present application may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.).

In some embodiments, the working memory 240 stores a plurality of instructions. The central processing units (CPUs) 205 may be configured to access the working memory 240 and to execute the plurality of instructions to receive candidate data relating to an employment position candidate, match the employment position candidate with one or more employment positions based on the received candidate data, and generate one or more suggested employment positions for the employment position candidate, wherein the one or more suggested employment positions are automatically generated based on the matching of the employment position candidate with the one or more employment positions.

It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present application as described herein.

Figure 3:
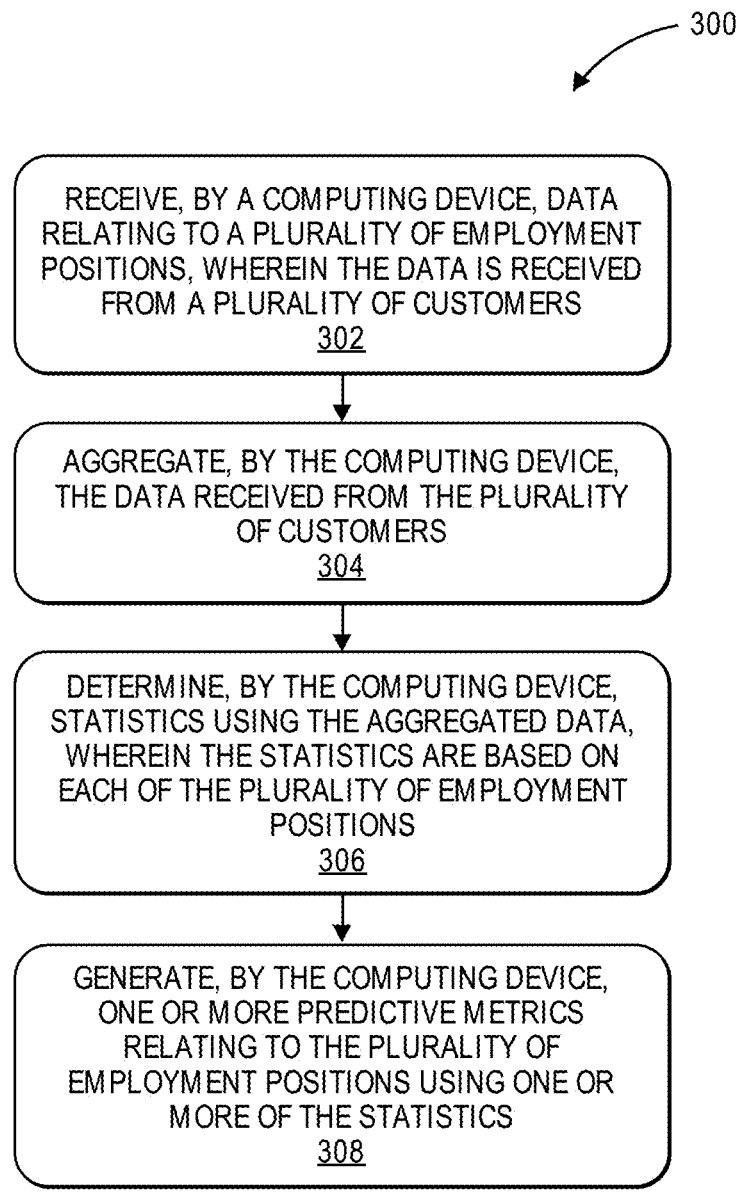
FIG. 3 illustrates a flowchart of an embodiment of a process for automatically suggesting one or more employment positions to a candidate according to one embodiment of the present application.

FIG. 3 illustrates an exemplary process 300 for automatically suggesting one or more suggested employment positions to a candidate. Process 300 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 300 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be nontransitory.

In some aspects, the process 300 may be performed by a computing device, such as the one or more server computers 120, 125, 130 shown in FIG. 1 or the computer system 200 shown in FIG. 2.

Process 300 may begin at 302 by receiving, by a computing device, candidate data relating to an employment position candidate. The candidate may be subscribed to a talent recruiting application. In some embodiments, the candidate data is included in a candidate profile. For example, a candidate profile may include data collected based on past activity by the candidate in a job search application (which may be part of the talent recruiting application) or past activity by the candidate on one or more websites. The past activity may include past job searches by the candidate, an amount of time spent by the candidate looking at a particular employment position, an amount of time spent by the candidate viewing an employer's website, and the like. In some embodiments, the candidate profile may include candidate supplied data received directly from the candidate. The candidate data may include demographic data of the candidate, such as a residence, an age, a gender, a hobby or other interest, and the like of the candidate. The candidate data may further include a desired location, a salary range expectation, job experience, and the like. The candidate data may also be automatically collected from various sources, such as one or more social networks, from persons recommending the candidate, and the like.

At 304, the process 300 matches the employment position candidate with one or more employment positions based on the received candidate data. At 306, the process 300 generates one or more suggested employment positions for the employment position candidate, wherein the one or more suggested employment positions are automatically generated based on the matching of the employment position candidate with the one or more employment positions. Matching of the candidate to the one or more employment positions may include matching the candidate data (e.g., keywords, salary range, and the like) to a plurality of employment positions stored in a database. For example, the candidate data may be matched to criteria from each of the employment positions. As a result, a candidate looking for a job can be presented with suggested employment positions based on candidate data. For example, the talent recruiting application and/or the job search application can build and/or access a profile for a candidate based on information received from various social networks, directly from the candidate, from persons recommending the candidate, etc. The candidate can then receive job recommendations from the talent recruiting application and/or the job search application based on the profile and other preferences and criteria for the open positions.

In some embodiments, the method further includes receiving one or more log-in credentials from the employment position candidate, and providing the employment position candidate with access to the job search application and/or the talent recruiting application in response to receiving the one or more log-in credentials. For example, a user may provide the log-in credentials in order to access the job search application. After the user logs in to the application, the one or more suggested employment positions may be displayed in a graphical interface upon the employment position candidate being provided with access to the job search application. For example, as soon as the user logs into the application, one or more suggested jobs may be automatically displayed for the user based on the candidate data received for the candidate. Accordingly, in some embodiments, a candidate may be provided with suggested jobs without having to provide any information to the application. For example, various data may be automatically collected for the candidate (e.g., collected based on past activity by the candidate on the job search application or one or more websites, collected from various social networks, collected from persons recommending the candidate, based on information collected directly from the candidate, and the like) and jobs that match the candidate's experience and interests may be suggested to the candidate based on the collected data. In some cases, the user can fine tune preferences and/or the candidate profile to adjust the recommendations. The matches can be based on data normalized between employers and candidates to map different expressions of the same criteria, attributes, and preferences.

In some embodiments, the candidate can apply to one or more of the suggested employment positions through the same interface as the information is presented. With the application process, additional, perhaps more detailed, information about the company can be supplied to the candidate.

In some embodiments, employment position matches for the candidate and information related to the positions matches may be provided in a timeline profile view of potential future co-workers. That is, when a candidate is applying and viewing company information, the talent recruiting application may show profiles for selected current employees of the company, e.g., potential co-workers/team members, etc. This view can include experience, education, etc. for those selected employees presented in a graphical format like a timeline. Other applications and uses, as well as variations in the exact implementation of various embodiments of the present application are contemplated and considered within the scope of the present application.

The above process described in FIG. 3 may be implemented and the suggested employment positions, in addition to other data, may be output using one or more graphical interfaces. FIGS. 4-20 illustrate exemplary graphical user interfaces for a talent recruiting application and/or a job search application according to various embodiments of the present application.

Figure 4:
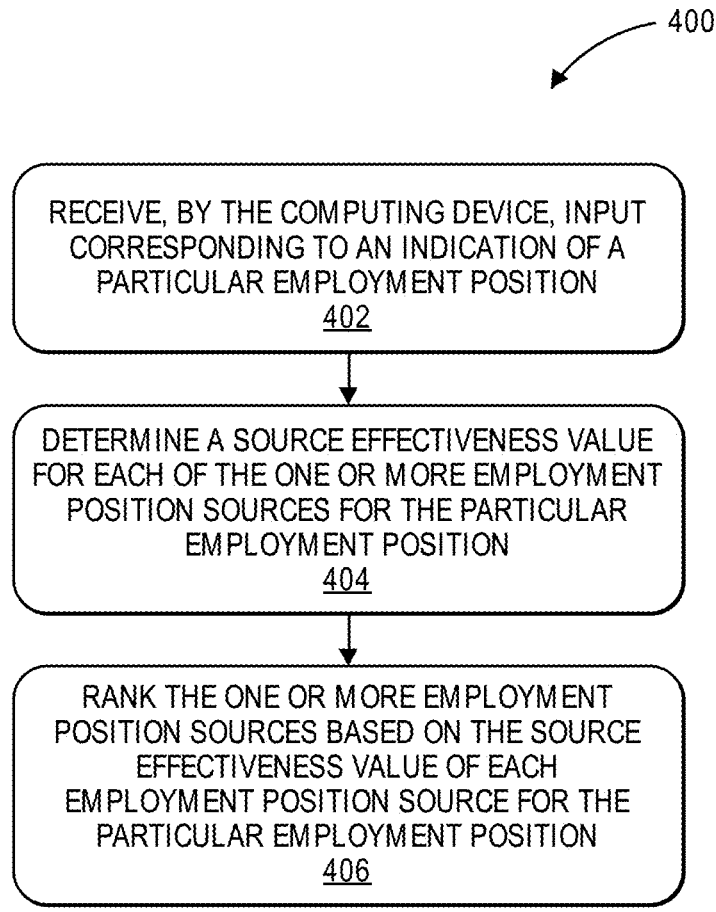

FIG. 4 illustrates an exemplary graphical interface 400 for a talent recruiting application and/or a job search application. A candidate may provide one or more log-in credentials in order to be authenticated and logged into the job search application. Once the candidate is logged into the application, the graphical interface 400 may be presented to the candidate, and a welcome message 402 welcoming the candidate to the application may be displayed.

The graphical interface 400 may also automatically display the suggested employment positions 406-410 upon the candidate logging into the application. For example, after the user logs in, the application may automatically match the candidate with employment positions that are stored in a database based on the received candidate data. As one example, data may be collected for a candidate indicating that the candidate is a software developer with 3 years of Java development experience that is currently earning $68,000 per year, that lives in San Jose, Calif., but desires to make greater than $75,000 and to live in Seattle, Wash. The data may be automatically collected based on the user's activity in the application or on one or more other applications and/or websites (e.g., social networking sites, job boards, job networking sites, technology blogs, instant messaging applications, and the like) or may be collected directly from the user. The data may be included in a candidate profile for the candidate. The candidate may then be matched with employment positions 406-410 stored in a database based on the collected data, and the employment positions 406-410 may then be generated and displayed as suggested employment positions via graphical interface 400. In some embodiments, suggested employment positions may be ranked based on the best matches for the candidate. For example, employment position 406 may be a top ranked employment position that matches the candidate's experience, matches the candidate's desired location (Seattle), and matches or exceeds the candidate's desired salary range. Employment position 408 may be ranked below employment position 406 because the location is in San Jose, Calif., but ranked higher than employment position 410 because the experience and salary range more closely match the candidate's credentials. Employment position 410 may be ranked below employment positions 406 and 408 because the salary range and experience are on the lower end of the candidate's credentials.

Based on the matching, the employment positions 406-410 may be suggested to the user when the user is presented with graphical interface 400. In some embodiments, the user may click or otherwise select a job suggestion icon or other button in order to generate the suggested employment positions 406-410. In some embodiments, the candidate can apply to one or more of the suggested employment positions 406-410 by selecting icons 412, 414, and/or 416. Additional, more detailed, information about the company can be supplied to the candidate during the application process. The candidate may log off of the application at any time by clicking or otherwise selecting log-off icon 418.

Figure 5:
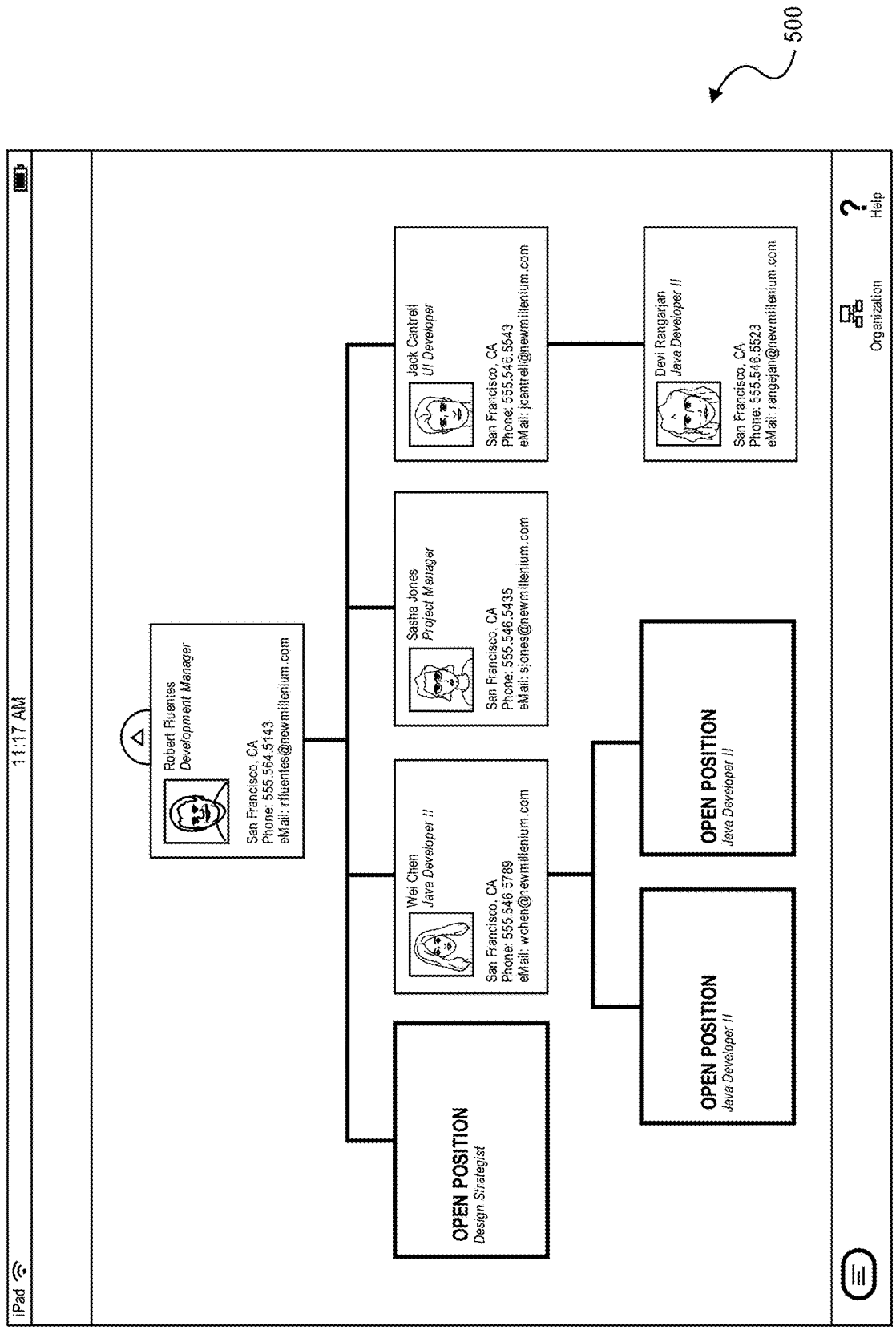
Figure 8:
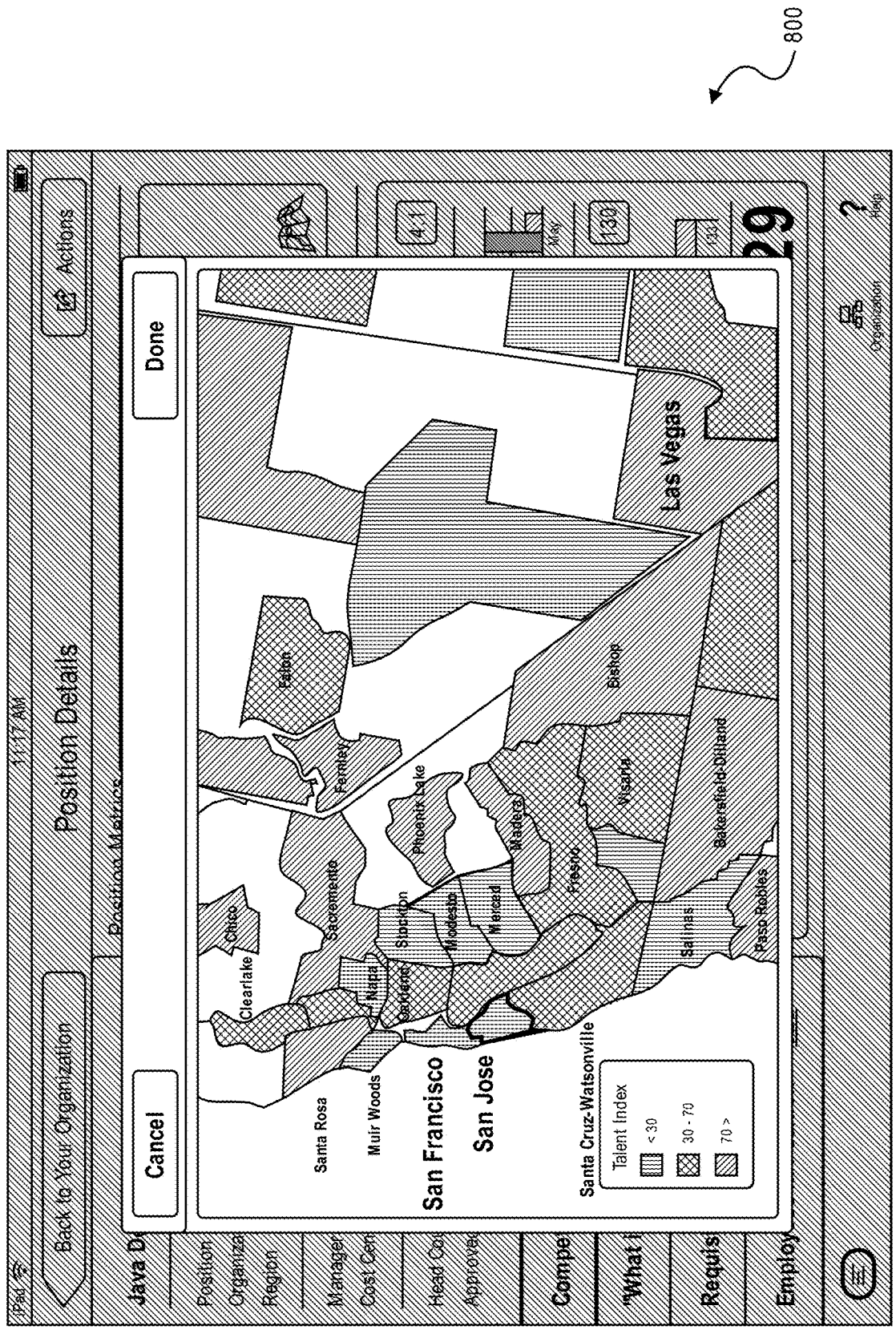

FIG. 5 illustrates an exemplary graphical interface 500 that allows a user within an organization (e.g., a department manager, an HR manager, etc.) to look at filled positions and open positions within the organization. The user may select or click on one of the open positions in order to advance to the graphical interface depicted in FIG. 6 and determine whether to post a job posting for the open position. For example, the user may select the open position for "Java Developer II," which will advance the graphical interface to the screen 600 displayed in FIG. 6. Various tabs 610-625 may be selected by a user to display different options relating to the open position.

Figure 6:
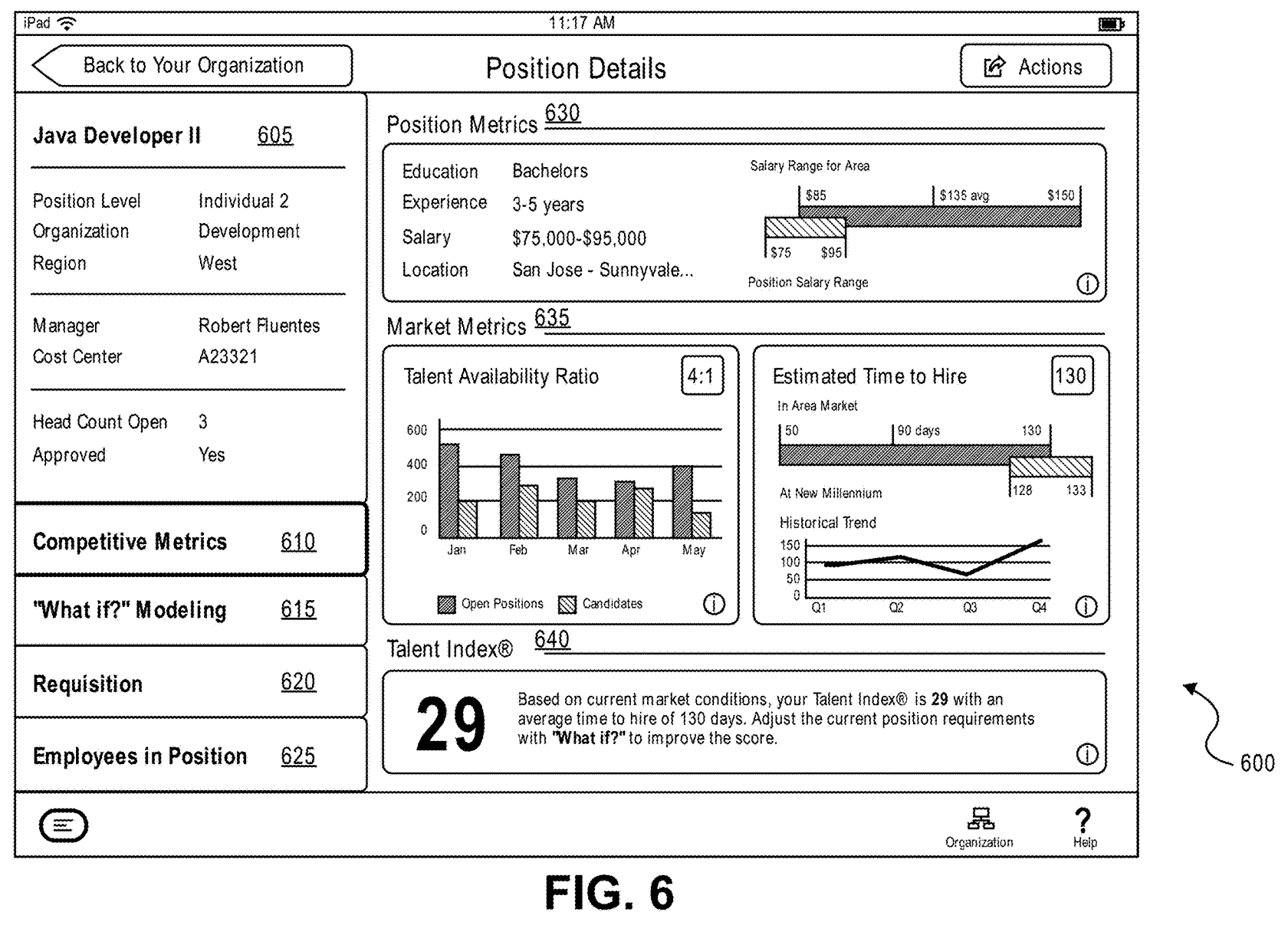

Referring to FIG. 6, the Competitive Metrics tab 610 is selected, which provides the screen 600 displaying the various position details of the Java Developer II position. A job description is provided in section 605 describing what the position entails. For example, section 605 includes the position level, the organization within the company, the region or location where the position is located, the name of the manager, the cost center, the head count of open positions, and whether or not the position has been approved. The position metrics 630 section describes the requirements of the position, including education, experience, salary range, specific location, and a graphical chart providing a comparison of the salary range for the location compared to the position salary range for the location.

Market metrics 635 are also displayed, providing various predictive metrics that are derived from data received from a plurality of customers. As illustrated in the screen 600, a talent availability ratio and an estimated time to hire are provided along with charts depicting a graphical representation of the metrics. For example, the talent availability ratio metric provides a comparison of open positions to possible candidates for those positions. A ratio may be provided indicating that there is a 4:1 ratio of open positions to candidates. The estimated time to hire metric provides a comparison of the time to hire in the market versus the time to hire at the company, as well as a chart showing the historical trend across a period of time. As depicted on the screen 600, the time to hire in the particular market is 130 days.

A talent index 640 is also displayed in the screen 600. For example, the talent index 640 provides a single measure or value that gives the marketplace an indication of relative difficulty for particular positions based on the various predictive metrics calculated using the customer data. The talent index is a representation of current market conditions based on quantitative and statistical analysis of previous postings, interviews, hirings, and the like, which can be derived from the customer data. The talent index can thus give a relative measure of the market between geographic areas. The user may select the "What if?" Modeling tab 615 to adjust the position requirements, which may result in an updated talent index score.

In response to a selection of the "What if?" Modeling tab 615, graphical interface 700 may be displayed, as illustrated in FIG. 7. The position metrics 630 section now enables the user to adjust the position requirements, such as the educational requirements, experience requirements, salary range, and/or the location. For example, the user may select a map icon, which results in the display of the graphical interface 800 illustrated in FIG. 8. The graphical interface 800 shows a map of the Northwestern United States with color coordinated talent index indications. The city of San Jose is outlined in bold because it is currently selected by the user. The color coordinated talent index indicates what the talent index is for the various locations according to the currently selected position metrics 630. For example, the Bakersfield-Deland area has a talent index of over 70 (indicated in green) according to the position metrics of a Bachelor's degree, 3-5 years of experience, and a salary range of $75,000-$95,000. The user may click or otherwise select a new location within the map in order to make a location selection in the position metrics 630.

As the user adjusts the position metrics, the results 705 may be dynamically updated in real time. The results 705 section provides a comparison of the talent availability ratio, the estimated time to hire, and the talent index prior to the change in the position metrics versus after the change. For example, FIG. 9 illustrates a graphical interface 900 showing a change in the talent availability ratio, the estimated time to hire, and the talent index after the user has updated the location from San Jose, Calif. to Seattle, Wash. As illustrated, the talent availability ratio increased from 4:1 in San Jose to 1:3 in Seattle. The increase in the talent availability ratio indicates that more candidates are available in Seattle than in San Jose. Furthermore, the estimated time to hire increased from 130 days in San Jose to 58 days in Seattle. As a result, the talent index increased from 29 to 72, indicating that the market conditions in Seattle are better for hiring talent for the Java Developer II position as compared to the market in San Jose.

The user may select the Requisition tab 620 in order to advance to the graphical interface 1000 illustrated in FIG. 10. The user may now build the requisition posting that will be provided to candidates using one or more employment sources. As used herein, the term "requisition" refers to a position that may be posted by a company, recruiter, or other user as a job posting. A new set of tabs 1010-1030 is depicted in the graphical interface 1000, which allow the user to specify various details for the requisition. For example, the Job Details tab 1010 enables the user to enter requisition details for the Java Developer II position. These details may include a detailed job description, qualifications, job responsibilities, owners of the position, and the like.

Figure 11:

As illustrated in FIG. 11, the user may select the Who Works Here? Tab 1015 in order to provide in graphical interface 1100 details regarding people with whom a potential candidate for the position would work. For example, the team of people that work in the same department may be listed along with a profile listing their position, location, contact information, and the like. Furthermore, a "Did you Know?" section may be displayed that provides useful information regarding the quality of employee referrals as a source for candidate hires. For example, the "Did you Know?" section may indicate that current and former employee referrals have a high source quality (indicating that many candidates apply based on a current employee referral) and a high hire quality (indicating the retention quality of hired candidates). A numerical or alphabetical indication may be used to show the quality of the source, and may include a percentage or an A-F rating (with A being the highest and F being the lowest).

Figure 12:

As illustrated in FIG. 12, the user may select the What is it like to work here? Tab 1020 in order to provide information regarding the culture of the company in graphical interface 1200. For example, a summary of the culture may be provided in the Our Company Culture section. Pictures and/or a description may be entered in the What We Do For Fun section to provide a snapshot of different activities that the current employees of the company engage in. For example, the employees may periodically take kayaking trips, go bowling, and/or have parties as a team. The user may provide details and pictures describing the different activities so that a potential candidate can have an inside perspective on the company's culture.

Figure 13:
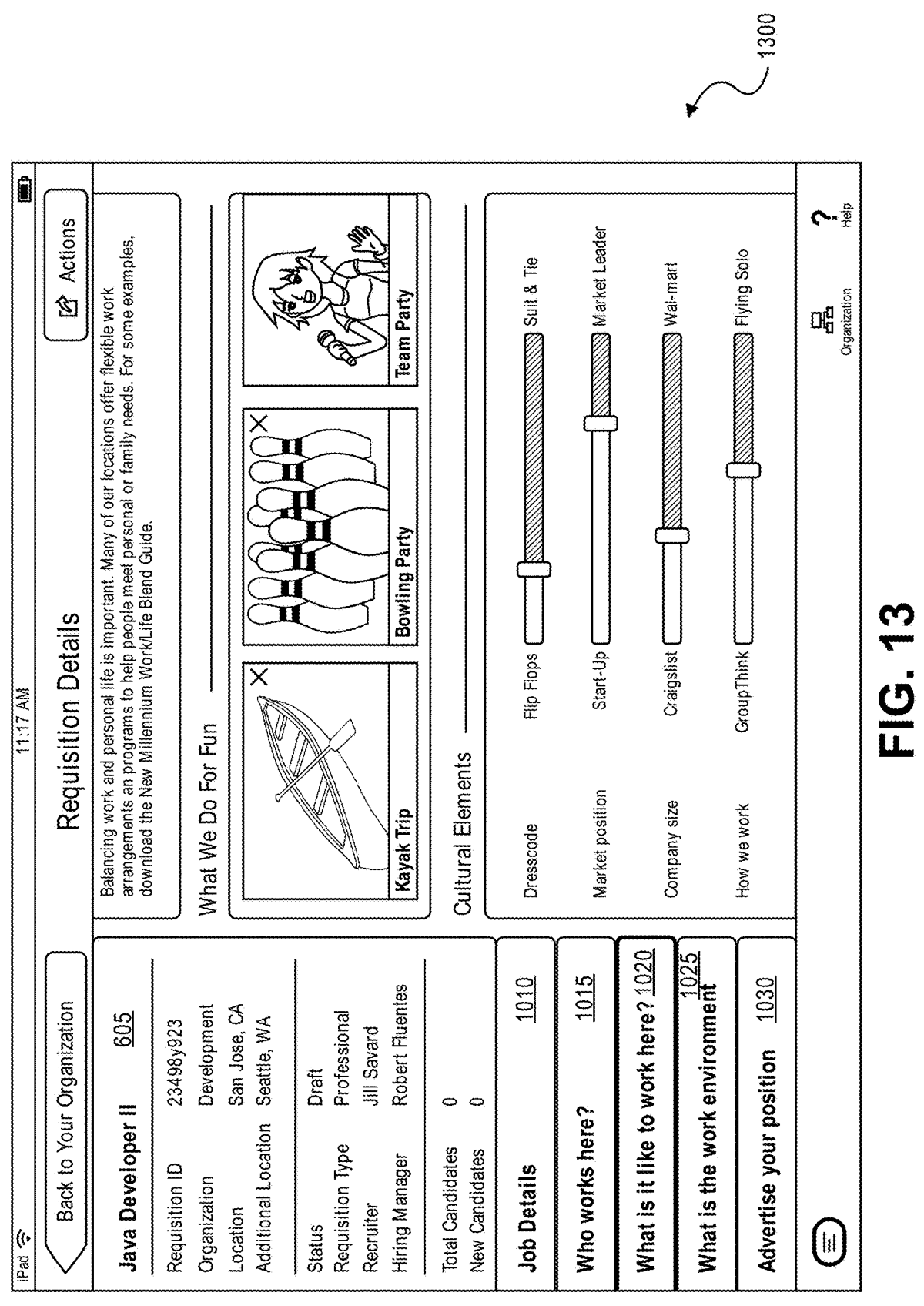

Other cultural details may be provided in the Cultural Elements section, as illustrated in FIG. 13. For example, slide bars or other adjustable graphical elements may be provided to indicate the scale of different cultural factors. For example, cultural factors may include dresscode, market position, company size, how we work, etc. The example illustrated in FIG. 13 indicates that the company has a casual dresscode, a medium to large market position, a medium size, and a mixed collaborative environment. The Cultural Elements section thus gives a potential candidate an idea of how the company culture may be from an everyday workday perspective.

Figure 14:

FIG. 14 illustrates graphical interface 1400 that shows work environment details in response to selection of the What is the work environment? Tab 1025. For example, in The Office section, pictures and/or a description of the office may be displayed to provide a potential candidate with an idea of the physical office environment. A potential candidate may be intrigued by the fact that the company has a game room within the office building, which may entice them to apply to the position. Furthermore, in The Tools section, different devices that may be provided to the potential candidate if hired are displayed. A description may also be provided to describe the purpose and/or functions of the tools. A section describing The Neighborhood may also be provided with information on the proximity surrounding the office. For example, information may be provided for the neighborhood itself, such as whether the company is in walking distance to restaurants, public transportation, workout facilities, and the like.

Figure 15:
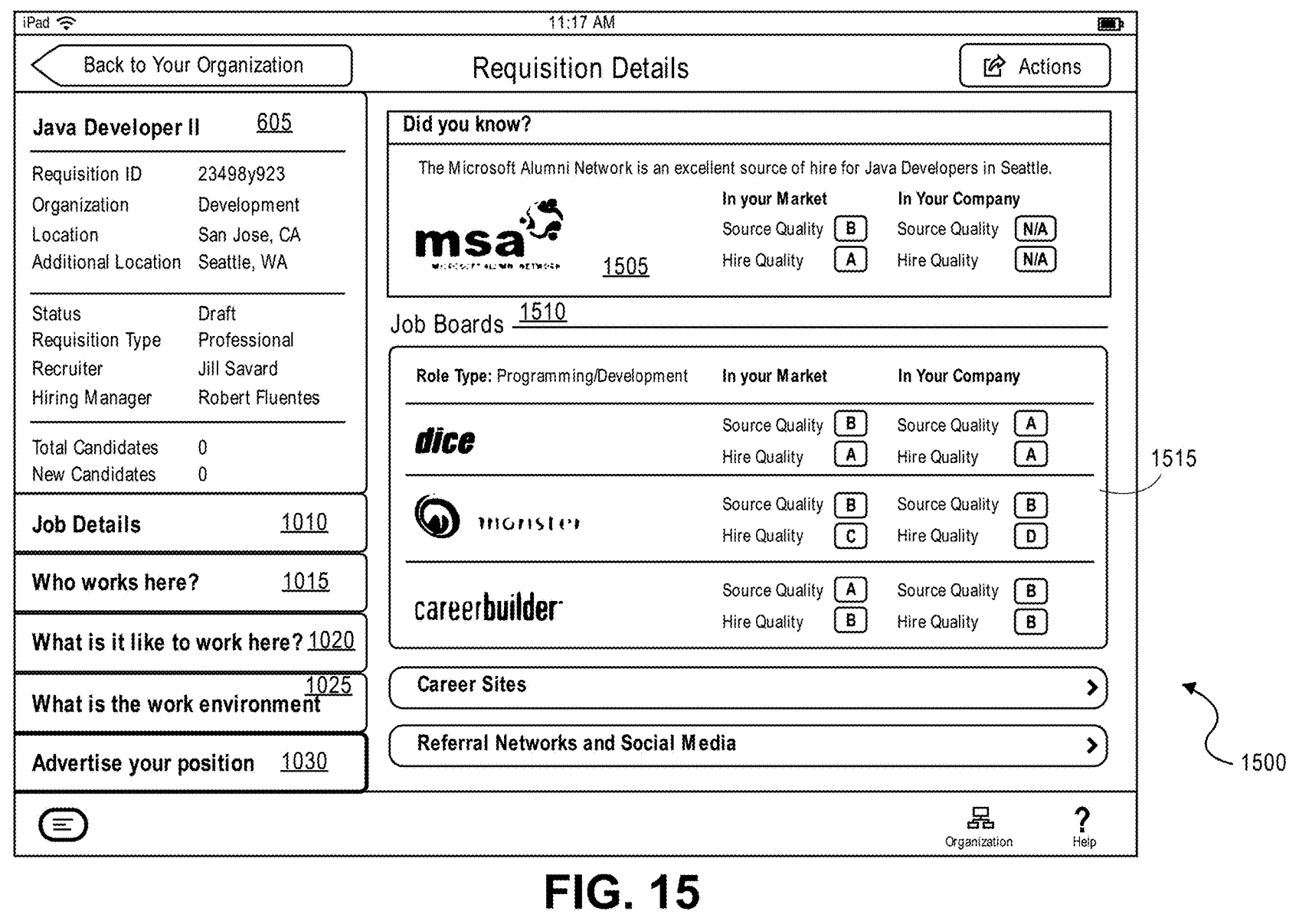
Figure 16:
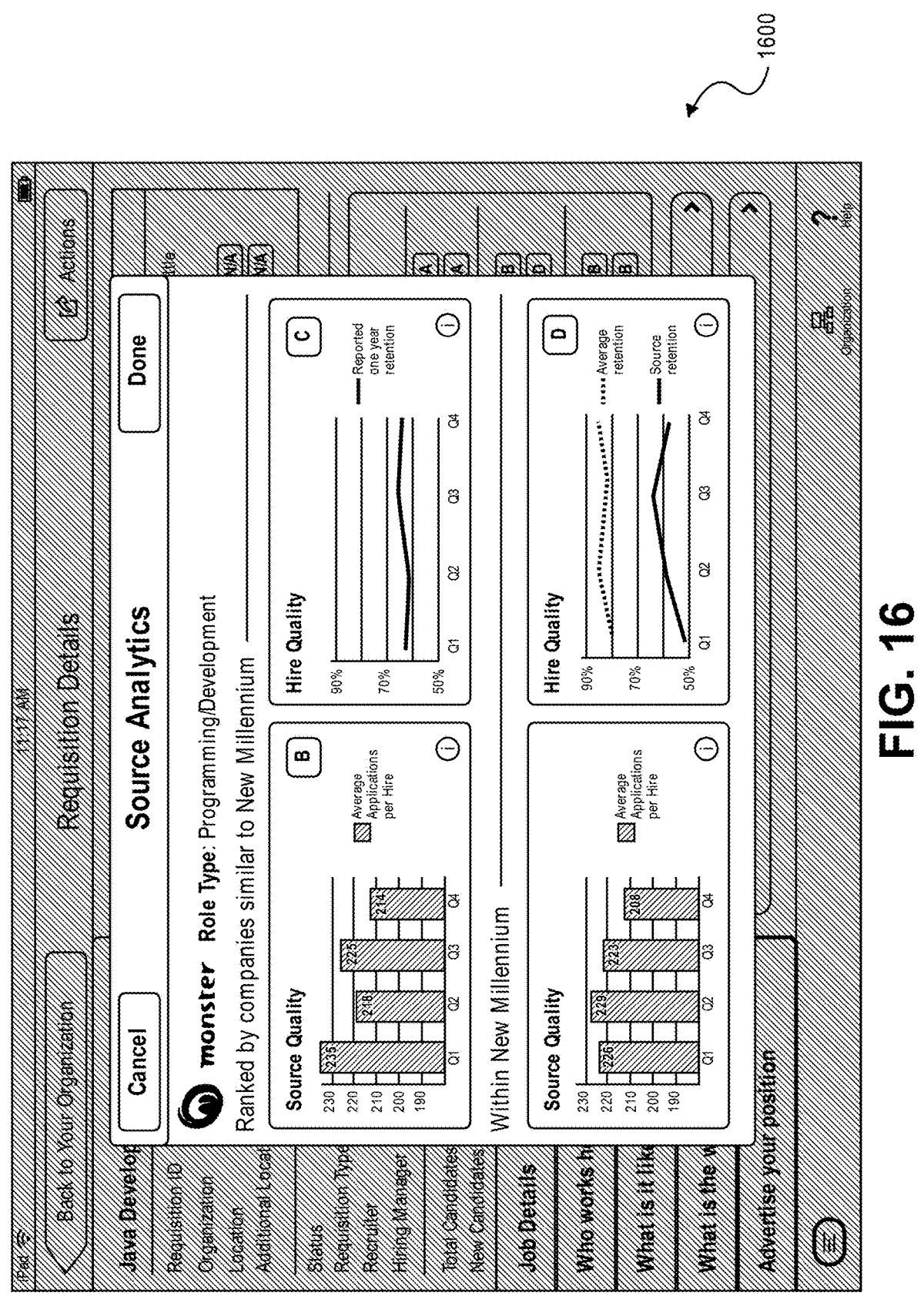

As illustrated in FIG. 15, a user may select the Advertise your position tab 1030 to review potential sources that may be used to post the position. Different source effectiveness values or scores may be provided for each displayed source. The graphical interface 1500 may include a Job Boards section 1510 that lists a group of job board sources that the user can potentially use to post the Java Developer II position. Each job board source may have a source effectiveness value for source quality and hire quality in the company's market and within the company. The job boards may be suggested based on the source effectiveness values. The job boards may also be ranked in the graphical interface 1500 based on the source effectiveness values. The source effectiveness values may be a numerical or alphabetical value used to show the quality of the source, and may include a percentage or an A-F rating (with A being the highest and F being the lowest). For example, the job board Dice may have a source effectiveness value of B for source quality within the market and an A for hire quality within the market. However, within the company, the source quality may have a value of A. As a comparison, the job board Monster may have lower source and hire qualities both in the market and within the company, as compared to Dice and CareerBuilder. The user may click or otherwise select the Monster tab in order to see further details on the job board, as illustrated in FIG. 16. For example, various graphical charts may show different source effectiveness values over time, such as average number of applications per hire for source quality and percentages of hires that were retained for at least one year for hire quality. If the user does not wish to post to Monster based on the poor source effectiveness values, the user may select the x-button 1515 shown in FIG.

Figure 17:

15 in order to remove Monster from the Job Boards section, as illustrated in the graphical interface 1700 of FIG. 17.

Figure 18:
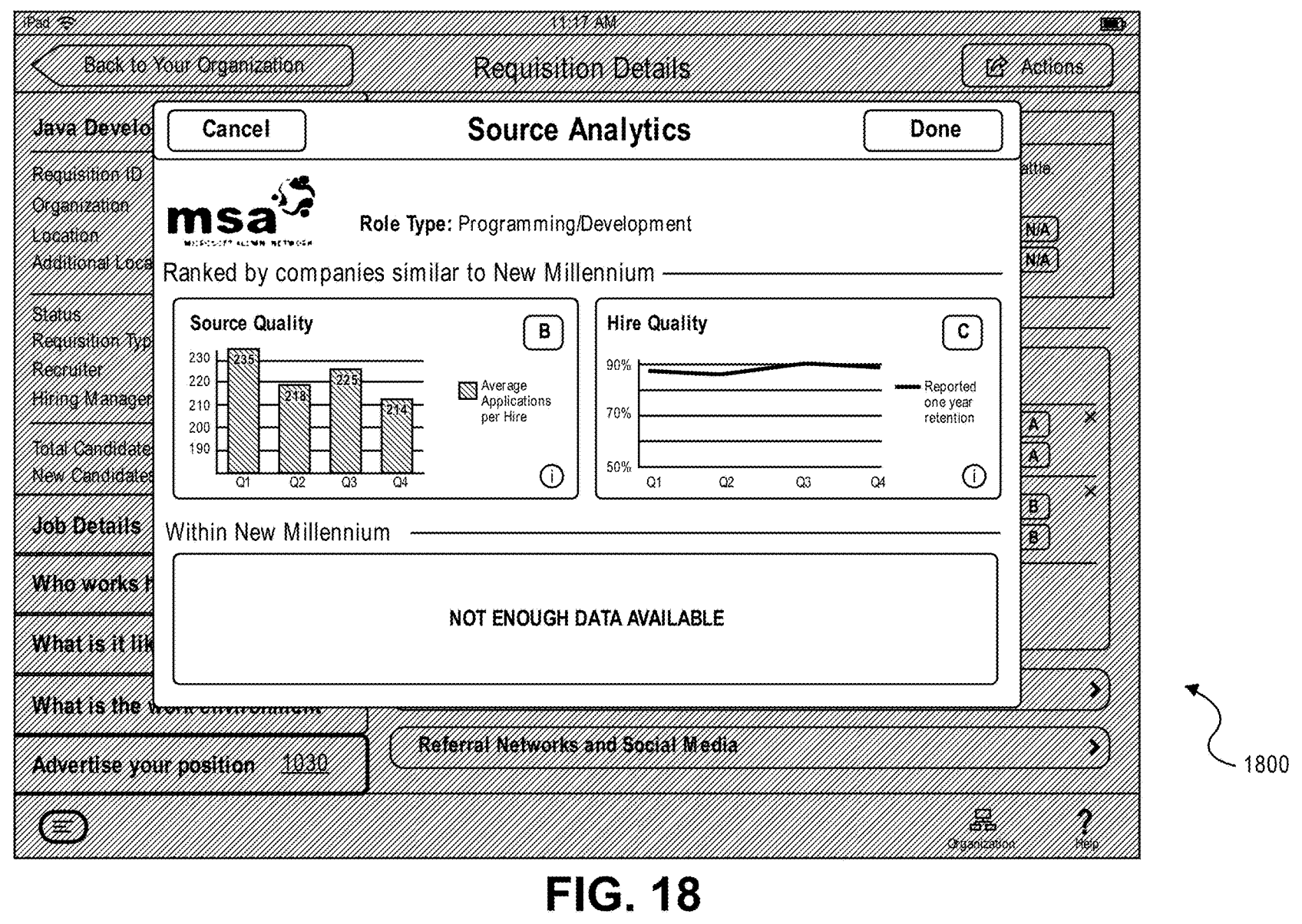

Returning to FIG. 15, a Did you Know? Section 1505 may be displayed in the graphical interface 1500 providing the user with an indication of one or more less well-known sources that the particular user may not be aware of. For example, the user may be a project manager that lives in San Jose, but has decided to hire for the Java Developer II position in Seattle based on the metrics comparison illustrated in FIG. 9 indicating that better talent is available in Seattle. Did you Know? Section 1505 may suggest the Microsoft Alumni Network (MSA) as a good source for the user to source from based on all of the data that the talent recruiting application has received and aggregated from different companies or organizations recruiting in the Washington area. The user may click or otherwise select the Microsoft Alumni Network (MSA) tab in order to view more details on the job source, as illustrated in FIG. 18. A graph for source quality indicates a number of applications per hire using the MSA source. A graph for hire quality indicates that approximately 80% of all hires were retained for at least one year. If the user decides to post to the MSA source, the user may drag-and-drop or otherwise indicate the desire to use the MSA source as a posting source for the Java Developer II position, as illustrated in the MSA tab 1905 of FIG. 19. The user may add further sources by selecting the Career Sites tab and/or the Referral Networks and Social Media tab. The career site, referral network, and social media sources may be added and/or deleted in a similar manner as the job board sources described above.

Figure 20:
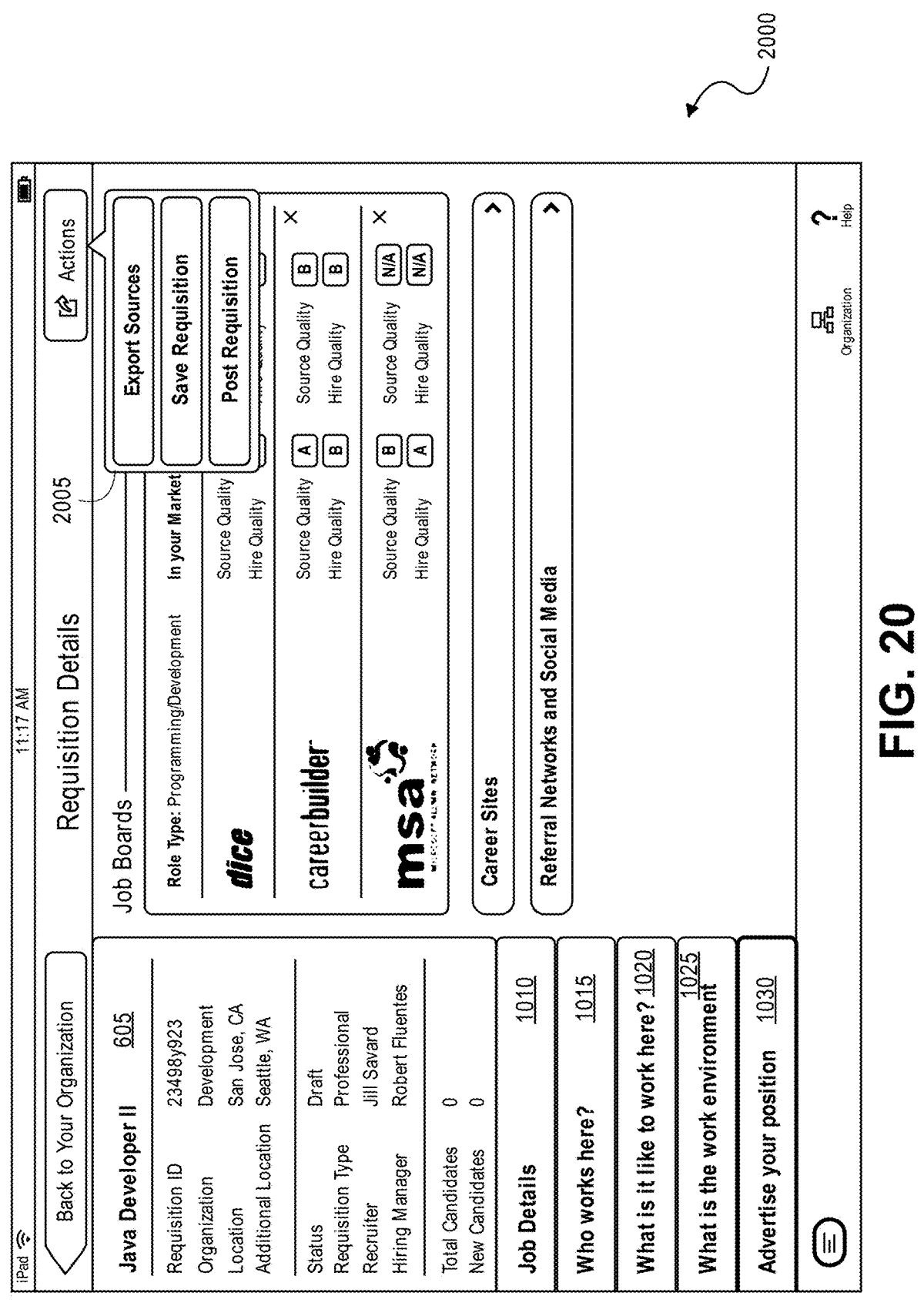

After the user has entered in all of the requisition, company, cultural, environmental, and source details, the user may select the actions button, which results in the display of an actions list 2005 in the graphical interface 2000 illustrated in FIG. 20. The actions list 2005 allows the user to choose among various choices, such as exporting the selected sources, saving the requisition for posting at a later time, or posting the requisition to the selected sources.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method, comprising:
pre-aggregating training data for a plurality of employment positions associated with a plurality of employment position sources, wherein the training data is in one or more sequence file formats;
converting the pre-aggregated training data into a set of sparse vectors;
training a classifier model with the set of sparse vectors, wherein the classifier model is configured to determine a employment position source effectiveness for an employment position source, wherein the employment position source effectiveness is associated with a likelihood a job seeker will be hired for an employment position if the job seeker applies through the employment position source;
receiving candidate data relating to an employment position candidate;
matching the employment position candidate with one or more employment positions based on the received candidate data and the one or more employment positions;
determining a suggested employment position for the employment position candidate from the one or more employment positions; and
generating, for the suggested employment position, a predicted employment position source effectiveness associated with an employment position source of the plurality of employment position sources, the predicted employment position source effectiveness determined by applying the classifier model to the suggested employment position and to the received candidate data relating to the employment position candidate.

2. The method of claim 1, further comprising:
receiving one or more log-in credentials from the employment position candidate; and
providing the employment position candidate with access to a job search application in response to receiving the one or more log-in credentials.

3. The method of claim 2, wherein the candidate data is included in a candidate profile, wherein the candidate profile includes data collected based on past activity by the employment position candidate in the job search application.

4. The method of claim 1, wherein the candidate data is included in a candidate profile, wherein the candidate profile includes data supplied by the employment position candidate.

5. The method of claim 1, wherein the candidate data includes demographic data of the employment position candidate.

6. The method of claim 5, wherein the demographic data includes one or more of a residence, an age, a gender, or a hobby of the employment position candidate.

7. The method of claim 1, wherein the candidate data includes one or more past job searches performed by the employment position candidate.

8. A job suggestion system, comprising:
a memory storing a plurality of instructions; and
one or more processors configured to access the memory, wherein the one or more processors are further configured to execute the plurality of instructions to:
pre-aggregate training data for a plurality of employment positions associated with a plurality of employment position sources, wherein the training data is in one or more sequence file formats;
convert the pre-aggregated training data into a set of sparse vectors;
train a classifier model with the set of sparse vectors, wherein the classifier model is configured to determine a employment position source effectiveness for an employment position source, wherein the employment position source effectiveness is associated with a likelihood a job seeker will be hired for an employment position if the job seeker applies through the employment position source;

receive candidate data relating to an employment position candidate;

match the employment position candidate with one or more employment positions based on the received candidate data and the one or more employment positions;

determine a suggested employment position for the employment position candidate from the one or more employment positions; and generate, for the suggested employment position, a predicted employment position source effectiveness associated with an employment position source of the plurality of employment position sources, the predicted employment position source effectiveness determined by applying the classifier model to the suggested employment position and to the received candidate data relating to the employment position candidate.

9. The system of claim 8, wherein the one or more processors are further configured to execute the plurality of instructions to:

receive one or more log-in credentials from the employment position candidate; and provide the employment position candidate with access to a job search application in response to receiving the one or more log-in credentials.

10. The system of claim 9, wherein the candidate data is included in a candidate profile, wherein the candidate profile includes data collected based on past activity by the employment position candidate in the job search application.

11. The system of claim 8, wherein the candidate data is included in a candidate profile, wherein the candidate profile includes data supplied by the employment position candidate.

12. The system of claim 8, wherein the candidate data includes demographic data of the employment position candidate.

13. The system of claim 12, wherein the demographic data includes one or more of a residence, an age, a gender, or a hobby of the employment position candidate.

14. The system of claim 8, wherein the candidate data includes one or more past job searches performed by the employment position candidate.

15. A non-transitory computer-readable memory storing a plurality of instructions executable by one or more processors, the plurality of instructions comprising:

instructions that cause the one or more processors to pre-aggregate training data for a plurality of employment positions associated with a plurality of employment position sources, wherein the training data is in one or more sequence file formats;

instructions that cause the one or more processors to convert the pre-aggregated training data into a set of sparse vectors;

instructions that cause the one or more processors to train a classifier model with the set of sparse vectors, wherein the classifier model is configured to determine a employment position source effectiveness for an employment position source, wherein the employment position source effectiveness is associated with a likelihood a job seeker will be hired for an employment position if the job seeker applies through the employment position source;

instructions that cause the one or more processors to receive candidate data relating to an employment position candidate;

instructions that cause the one or more processors to match the employment position candidate with one or more employment positions based on the received candidate data and the one or more employment positions;

instructions that cause the one or more processors to determine a suggested employment position for the employment position candidate from the one or more employment positions; and instructions that cause the one or more processors to generate, for the suggested employment position, a predicted employment position source effectiveness associated with an employment position source of the plurality of employment position sources, the predicted employment position source effectiveness determined by applying the classifier model to the suggested employment position and to the received candidate data relating to the employment position candidate.

16. The non-transitory computer-readable memory of claim 15, wherein the plurality of instructions further comprise:

instructions that cause the one or more processors to receive one or more log-in credentials from the employment position candidate; and instructions that cause the one or more processors to provide the employment position candidate with access to a job search application in response to receiving the one or more log-in credentials.

17. The non-transitory computer-readable memory of claim 16, wherein the candidate data is included in a candidate profile, wherein the candidate profile includes data collected based on past activity by the employment position candidate in the job search application.

18. The non-transitory computer-readable memory of claim 15, wherein the candidate data is included in a candidate profile, wherein the candidate profile includes data supplied by the employment position candidate.

19. The non-transitory computer-readable memory of claim 15, wherein the candidate data includes demographic data of the employment position candidate.

20. The non-transitory computer-readable memory of claim 19, wherein the demographic data includes one or more of a residence, an age, a gender, or a hobby of the employment position candidate.

* * * * *

UNITED STATES PATENT AND TRADEMARK OFFICE
CERTIFICATE OF CORRECTION

PATENT NO. : 10,719,810 B2  
APPLICATION NO. : 16/033102  
DATED : July 21, 2020  
INVENTOR(S) : Rammohan Page 1 of 1

It is certified that error appears in the above-identified patent and that said Letters Patent is hereby corrected as shown below:

In the Specification

Column 7, Line 48, delete "Java," and insert -- Java™, --, therefor.

Column 9, Line 42, delete "nontransitory." and insert -- non-transitory. --, therefor.

Signed and Sealed this  
Twentieth Day of April, 2021

Drew Hirshfeld  
*Performing the Functions and Duties of the*  
*Under Secretary of Commerce for Intellectual Property and*  
*Director of the United States Patent and Trademark Office*